United States Patent Office 2,723,295
Patented Nov. 8, 1955

2,723,295

SELECTIVE CRYSTALLIZATION OF HEXITOLS

Frederick Richard Pence, Wilmington, Del., assignor to Atlas Powder Company, Wilmington, Del., a corporation of Delaware No Drawing. Application May 15, 1951,
Serial No. 226,539

15 Claims. (Cl. 260—637)

This invention relates to a chemical process. More specifically, it relates to a process of crystallization.

It is an object of the present invention to provide a process for the accelerated removal of slowly crystallizing and difficultly filterable dissolved solids from very viscous, supersaturated solutions.

Another object is to provide a process for the accelerated removal of final traces of dissolved solids in excess of saturation from viscous liquids.

Another object is to provide a process, which will permit simultaneous, accelerated crystal growth, nucleation and filtration from initially supersaturated viscous solutions.

A further object is to provide a process for the removal of final traces of dissolved hexitol solids such as mannitol and/or dulcitol in excess of saturation from aqueous solutions of hexitols and mixtures of polyols and polyol degradation products which result from such processes as the chemical, electrical or catalytic reduction of mono- and polysaccharides or their polyol derivatives.

A still further object is the removal of mannitol in excess of saturation from viscous, aqueous solutions containing a high percentage of sorbitol or polyols which are sorbitol degradation products and which may also contain sorbitol, which solutions are produced by the chemical or electrolytic reduction of mono- or polysaccharides.

These and other objects will become apparent in the course of the following description and claims.

The reduction and/or degradation of mono- and polysaccharides and their polyol derivatives by chemical, electrical and catalytic methods is well known. (Ipatieff, "Ber. deut. chem." No. 45, p. 3218, 1912.) Descriptions of such processes may also be found in the United States patents to Creighton, No. 1,712,952; Lautenschlager et al., No. 1,915,431; Larchar, No. 1,963,997; Mueller et al., No. 1,990,245; Creighton, No. 1,990,582; Rothrock, No. 2,004,135; Hanford, No. 2,209,055; Power, No. 2,280,975; Brown, No. 2,280,887; Hales, No. 2,289,189; Lenth et al., No. 2,290,439; Rose, No. 2,292,293; Hales, Nos. 2,300,218 and 2,303,210; Bottoms et al., No. 2,335,731; Stengel et al., No. 2,381,316; Hartstra et al., No. 2,518,235; Creighton et al., No. 2,458,895; and Lolkema et al., No. 2,546,103. These processes are also discussed in numerous domestic and foreign publications.

While the solubility of sorbitol in water is very high, permitting the formation of heavy syrups high in sorbitol content which are excellent as humectants for tobacco, glue and the like, the solubility of the isomeric mannitol and dulcitol is relatively low. It has been found that in any of the above described processes for the production of sorbitol syrups or syrups containing polyols which are sorbitol degradation products and which may also contain sorbitol wherein mannitol and/or dulcitol is produced either by virtue of choice of starting materials or reaction conditions favoring formation of such a product that final traces of these latter dissolved hexitols in excess of saturation cannot be separated by conventional treatment and that solutions, which are so contaminated, have a tendency to cloud on storage due to their subsequent precipitation.

The bulk of the sparsely soluble hexitols can be removed by a dilute aqueous crystallization during which the viscosity of the magma is low. Such conditions facilitate crystal growth and filtration. However, these conditions will not permit removal of sufficient of the relatively insoluble hexitols to maintain the final concentrated, viscous, humectant, polyol syrup free of such hexitols dissolved in excess of saturation. This supersaturation phenomenon appears to result in large measure from an inability to promote nucleation and precipitation under the necessary conditions of high viscosity. Removal of these undesirable final traces in previous methods of purification has involved decreasing the viscosity of the mother liquor with an organic solvent such as ethanol and cooling to a very low temperature. Such procedure is unsatisfactory both from the economy standpoint, since solvent recovery is necessary and solvent losses have been relatively high, and because the method does not give sufficiently complete removal of the undesirable hexitols to avoid clouding during storage.

In accordance with the present invention it has been discovered that accelerated removal of final traces of slowly crystallizing sparsely soluble, dissolved solids in excess of saturation from difficultly filterable, very viscous, supersaturated, aqueous sorbitol solutions or solutions containing polyols which are sorbitol degradation products and which may also contain sorbitol can be accomplished by filtration of the supersaturated solution relative to the slightly soluble components at a controlled rate through an entraining bed of previously deposited crystals corresponding in species to the slightly soluble component, removal of which is desired. Thus the final traces of mannitol and/or dulcitol in excess of saturation remaining in a viscous sorbitol syrup or a syrup containing polyols which are sorbitol degradation products and which may contain sorbitol after conventional crystallization and concentration, can be removed, in accordance with the present invention, by passing the viscous polyol, supersaturated relative to mannitol and/or dulcitol, through a bed of mannitol and/or dulcitol, respectively, at a controlled rate.

The thickness and physical characteristics of the crystal bed is not critical. It is obvious that the deposited crystals must not be so fine as to clog the filter septum. It is also obvious that maximum rate of flow and crystal surface area provided by a given thickness of the crystal bed will be related functions. The rate of crystal formation which determines the maximum allowable flow rate through a given bed thickness is primarily a function of the solubility of the solid in the liquid, the extent of supersaturation of the dissolved solid in the liquid and the viscosity of the liquid. The maximum rate of flow which will permit reduction from a state of supersaturation to a state of saturation must be empirically determined. In general, for hexitols it has been found that the thickness of the crystal bed and the rate of flow should be so adjusted to permit a contact time between fluid and crystals within the limits of from two and one-half and three and one-half hours. Naturally, this limit will vary according to the material which is treated.

Any conventional filtration apparatus may be employed. It is recognized, of course, that the viscous nature of the solution will usually require the application of pressure or vacuum to the system. The nature of the septum is not critical. It may be of the textile, bulk or rigid porous variety. Crystals of the desired dissolved solids may be deposited upon its face, or in the case of bulk septa, interspersed with the inert particles. The coated type is conveniently formed by filtering out an initial strike of the crystals before concentration renders the solution too viscous for conventional crystallization. Nucleation and crystal growth are both observed to occur within the crystalline deposit.

The following example is cited to illustrate the invention. It is not intended to limit it in any way.

*Example*

An aqueous hexitol solution containing dissolved solids in a ratio of approximately 35 parts of mannitol to 65 parts of sorbitol as prepared by the catalytic reduction of invert sugar described in the United States patent to Power, No. 2,280,975 (Example 3), is adjusted by evaporation to a water content of approximately 23%. The hexitol solution is then cooled slowly (1° C./hr.) in a conventional type batch crystallizer to 20° C. At this point a maximum of mannitol precipitates without precipitation of sorbitol. At 20° C. the viscosity of the solution is low (150 to 250 centipoises), and the bulk of the mannitol crystallizes. A portion of the magma is filtered through a plate and frame filter press containing two-inch frames until a coating of ¼" of mannitol crystals is deposited upon the filter cloth. The remainder of the magma is filtered through a separate plate and frame filter press. The mannitol from this filtration is purified by recrystallization. The mother liquor is concentrated to a water content of about 15.5%. At this concentration it contains approximately 1% mannitol in excess of saturation at 20° C. The resulting solution is clear and very viscous (approx. 3000 cp. at 25° C.). No crystallization of mannitol is detectable. A small sample of this supersaturated solution, stored at 20° C., precipitates mannitol in the form of very fine, difficultly filterable crystals over a period of three weeks. The concentrated, viscous mother liquor is cooled to 20° C., and passed through the coated filter under pressure at a rate of 0.053 gal./sq. ft. hr. (representing a contact time of 2.94 hrs.). The filter effluent is found to be clear and viscous and contains no detectable mannitol. Furthermore, no cloud formation is apparent after storage for a period of six months.

The process, while described as a batch process, may be easily adapted to continuous operation by application of known engineering principles. Furthermore, many variations of the above disclosed invention will be apparent to those skilled in the art without departing from the inventive concept.

What is claimed is:

1. A process for the accelerated removal of final traces of a slowly crystallizing, sparsely soluble, dissolved hexitol in excess of saturation from a viscous syrup containing a high concentration of a readily soluble hexitol which comprises passage of the said viscous syrup supersaturated with respect to the sparsely soluble hexitol through a bed of crystals of said sparsely soluble hexitol.

2. A process as in claim 1 wherein the said sparsely soluble hexitol is mannitol.

3. A process as in claim 2 wherein the passage of said syrup through mannitol crystals is maintained at a rate of flow which permits a contact time of syrup with crystal surface of from 2.5 to 3.5 hours.

4. A process as in claim 1 wherein the said sparsely soluble hexitol is dulcitol.

5. A process as in claim 4 wherein the passage of said syrup through dulcitol crystals is maintained at a rate of flow which permits a contact time of syrup with crystal surface of from 2.5 to 3.5 hours.

6. A process for the accelerated removal of final traces of mannitol in excess of saturation from an aqueous, viscous, sorbitol syrup containing mannitol which comprises passage of the aqueous, viscous, sorbitol syrup containing mannitol in excess of saturation through a bed of mannitol crystals.

7. The process as described in claim 6 wherein the passage of the sorbitol syrup containing mannitol through the mannitol crystals is maintained at a rate of flow which permits a contact time of from two and one-half to three and one-half hours.

8. A process for the accelerated removal of final traces of dulcitol in excess of saturation from an aqueous, viscous, sorbitol syrup containing dulcitol which comprises passage of the aqueous, viscous, sorbitol syrup containing dulcitol in excess of saturation through a bed of dulcitol crystals.

9. The process as described in claim 8 wherein the passage of the sorbitol syrup containing dulcitol through the dulcitol crystals is maintained at a rate of flow which permits a contact time of sorbitol syrup containing dulcitol with crystal surface of from two and one-half to three and one-half hours.

10. A process for the accelerated removal of final traces of mannitol in excess of saturation from an aqueous, viscous, polyol solution containing sorbitol and sorbitol degradation products, as well as mannitol, which comprises passage of the aqueous, viscous, polyol solution containing sorbitol and sorbitol degradation products, as well as mannitol in excess of saturation, through a bed of mannitol crystals.

11. The process as described in claim 10 wherein the passage of the polyol solution through the mannitol crystals is maintained at a rate of flow which permits a contact time of polyol solution with crystal surface of from two and one-half to three and one-half hours.

12. A process for the accelerated removal of final traces of dulcitol in excess of saturation from an aqueous, viscous, polyol solution containing sorbitol and sorbitol degradation products, as well as dulcitol, which comprises passage of the aqueous, viscous, polyol solution containing sorbitol and sorbitol degradation products, as well as dulcitol in excess of saturation, through a bed of dulcitol crystals.

13. A process for the accelerated removal of final traces of mannitol and dulcitol in excess of saturation from an aqueous, viscous, polyol syrup which comprises passage of the aqueous, viscous, polyol syrup containing mannitol and dulcitol in excess of saturation through a bed of mannitol and dulcitol crystals.

14. A process for the accelerated removal of final traces of mannitol and dulcitol in excess of saturation from an aqueous, viscous, sorbitol syrup containing mannitol and dulcitol which comprises passage of the aqueous, viscous, sorbitol syrup containing mannitol and dulcitol in excess of saturation through a bed of mannitol and dulcitol crystals.

15. A process for the accelerated removal of final traces of mannitol and dulcitol in excess of saturation from an aqueous, viscous, polyol solution containing sorbitol and sorbitol degradation products, as well as mannitol and dulcitol, which comprises passage of the aqueous, viscous, polyol solution containing sorbitol and sorbitol degradation products, as well as mannitol and dulcitol in excess of saturation through a bed of mannitol and dulcitol crystals.

References Cited in the file of this patent

UNITED STATES PATENTS

| | | |
|---|---|---|
| 1,066,397 | Fromm et al. | July 1, 1913 |
| 2,233,606 | Hass | Mar. 4, 1941 |
| 2,315,699 | Goepp | Apr. 6, 1943 |
| 2,594,863 | Buck et al. | Apr. 29, 1952 |